Patented Sept. 19, 1944

2,358,623

UNITED STATES PATENT OFFICE 2,358,623

COATING COMPOSITION

George O. Burr, Minneapolis, Minn., assignor to Regents of the University of Minnesota, Minneapolis, Minn., a corporation of Minnesota No Drawing. Application May 8, 1941, Serial No. 392,495

13 Claims. (Cl. 106—252)

The present invention relates to improved low cost coating compositions of the protective and decorative types, and more particularly to low cost, quick-drying compositions having resistance to water, air, oil and mild chemicals, and adherence equal to or exceeding coating compositions prepared from expensive tung oil.

The improved film-forming coating compositions of the present invention have, as one of the ingredients, a polyhydric alcohol ester of polyene materials having two or more double bonds in conjugated relationship. Such polyene materials may, for example, be of the type wherein conjugation of the double bonds is produced by reaction of natural or synthetic non-drying or semi-drying with basic reagents, as set forth in my co-pending application, Serial No. 215,299, filed June 22, 1938, now Patent 2,242,230, of which the present application is a continuation-in-part, or as set forth in my co-pending applications, Serial No. 391,222, filed April 30, 1941, and Serial No. 391,221, filed April 30, 1941, and the co-pending application of Kass and Burr, Serial No. 391,800 filed May 3, 1941.

It is an object of the present invention to provide improved low cost protective and decorative coating compositions having not only rapid drying characteristics, but at the same time, having resistance to water, oil, air and various mild chemical reagents and adherence equal to or exceeding the qualities of tung oil coating compositions.

It is another object of the invention to provide such a surfacing composition of either the pigmented or unpigmented type optionally containing natural or synthetic resins as ingredients.

Other and further objects are those inherent in the invention as will be apparent from the description and claims hereinafter set forth.

In preparing the improved compositions of the present invention, a polyhydric alcohol ester or ester mixture of a suitable polyene material is first obtained or prepared, as for example, by the methods of the aforesaid applications. The method of preparation for such polyene, materials and their esters, is generally, as follows:

Natural oils such as soya bean oil or linseed oil, corn oil, sunflower seed, perilla and the like oils or substances derived therefrom such as the fatty acids thereof, are reacted with a basic reagent, preferably an alkali hydroxide or alcoholate such as sodium or potassium hydroxide or alcoholate, by heating the mixture at a temperature and for a period of time depending upon the degree of conjugation and rapidity of drying desired in the ultimately reconstituted polyhydroxy alcoholic esters. The reaction yields mixtures of isomeric conjugated and unconjugated fatty acids varying in composition in accordance with the starting material used and with the degree and length of treatment.

While the mechanism of the reaction in which conjugation is produced is not entirely understood, it is believed that the basic reagent acts upon the molecules undergoing transformation and causes convergence of the double bonds therein resulting in production of conjugation and geometric isomerization in the mixture of reaction materials.

The natural vegetable oils such as soya bean, linseed, corn, sunflower seed, perilla and the like, which as heretofore mentioned may be processed to produce the conjugated polyene starting materials of this invention, are similar in that they contain in combination and with other materials either one or the other or both polyenic groups of the 9,12 octadecadienoic and 9,12,15 octadecatrienoic acids, commonly known as linoleic and linolenic acids respectively. It is, of course, understood that in the natural oils, these acids are normally found in combination with glycerine as glycerides. Wherever present in the natural oils, these acids are acted upon by the basic reagents and far reaching changes are produced. The double bonds converge to the conjugated positions, where the processes are carried to completion, and geometric isomerization takes place both in the produced conjugated compounds and in such portions of the compounds wherein conjugation appears not to be produced.

Linseed oil contains, according to some authorities 40-50% linolenic acids (9,12,15 octadecatrienoic acid) and 20-40% linoleic acid (9,12 octadecadienoic acid). When linseed oil is used as the starting material, after processing in accordance with the aforesaid application, it contains among other constituents, stereo-isomers, more specifically cis- and transisomers of 10,12,14 octadecatrienoic acid. One such isomer has a melting point of about 79° C., and others of the eight possible geometric isomers of this 10,12,14 octadecatrienoic acid, are also present in liquid form. The material processed from linseed oil, in addition contains appreciable quantities of stereo-isomeric cis- and trans-10,12 octadecadienoic acids. One of these isomers has a melting point of about 57° C., another about 9° C., and another about 44° C. Furthermore, the processed material in some instances appears also to contain some fractions of polyene materials of the unconjugated type, with the double bonds in the same position in the carbon chain as in the respective starting products, but geometrically isomerized as compared with the starting material.

When soya bean oils or their fatty acids are used as the starting materials, the same type of transformations occur, with seemingly the same end products but in different proportions than where linseed oil is used as the starting material. This is apparently due to differences in the proportions of linolenic and linoleic acids present in glycerides in the soya bean oils as compared with the linseed oils.

Linseed and soya bean oils are cited as exemplary of natural oils containing both linolenic and linoleic acids, which may be processed, with good results and economy in producing the polyenic starting materials used in the film-forming coating compositions of the present invention.

When corn, cottonseed or similar oils or their fatty acids are used no 10,12,14 octadecatrienoic acids are produced for these starting materials do not naturally contain the 9,12,15 octadecatrienoic acid. However, the 9,12 octadecadienoic acid present in these materials is transformed as before to the isomeric mixtures of 10,12 octadecadienoic acids as previously described.

The oils or fatty acids which have been treated to increase their conjugation are then resynthesized to form esters of a polyhydric alcohol. Thus, when starting with soya bean oil or linseed oil the fatty acids therefrom in which the conjugation has been increased as described above, may be reacted with a polyhydric alcohol such as glycol, glycerol, sorbitol, erythritol, mannitol or the like to produce the corresponding esters. These are exceedingly useful for the production of film-forming compositions, such as varnish, paints, lacquers and the like as set forth herein.

The operating temperatures, conditions of reaction and other details of these procedures are illustrated by the following examples which are intended merely to be exemplary and not as limitations upon the invention. For completeness, there are included herein illustrative Examples I and II relating to the making of the polyene starting materials, and Examples III through VI relating to the utilization of the thus produced starting materials in film-forming compositions of the present invention.

*Example I*

As an example of one of the procedures by which the polyene starting materials hereof, may be prepared, one mol of linseed oil and four mols of potassium hydroxide are mixed in an excess of glycol and the mixture heated. Saponification of the linseed oil is quickly effected whereupon the mixture becomes homogeneous. The mixture is then refluxed for thirty minutes and the fatty acids isolated by slight acidification, as in usual saponification procedure. The glycol being very soluble in water is easily removed with the water in the isolation procedure. Because of the high boiling point of glycol, the refluxing of the mixture takes place at about 156° C. and as a result the reaction is rapidly completed. Spectographic analysis of the resultant product showed an absorption of 410 at 2350 Ångstrom units and 210 at 2700 Ångstrom units, thus indicating large quantities of the conjugated double bond components.

The thus converted fatty acids may be used, with or without purification, for resynthesis into the polyhydroxy alcohol esters by suitable reaction with substances, such as glycerine, sorbitol, erythritol or mannitol. Thus, when making the triglycerides, 10 equivalents of the fatty acids are heated with 9 equivalents glycerine at 150-170° C. for 4 to 6 hours and thereafter at 210-225° C. for 6 hours or longer while stirring. The resultant glycerides are useful for the making of coating materials as set forth in Examples III-VI.

*Example II*

As a further example of the use of natural oil as the polyene starting ingredient, one mol of soya bean oil may be refluxed for five and one-half hours with 4 mols of potassium hydroxide in isoamyl alcohol, the boiling point in this instance being about 130° C. The resultant product is then subjected to a vacuum distillation so as to remove the isoamyl alcohol. The resultant fatty acid product mixture is found to contain the conjugated ingredients as indicated by an absorption factor of 373 at 2350 Ångstrom units and 70.5 at 2700 units.

The resultant fatty acids are then separated and resynthesized into the polyhydroxy alcoholic esters as set forth in Example I.

Other methods of producing the conjugated fatty acid starting materials, than those herein described in Examples I and II, are set forth in the co-pending applications hereinbefore mentioned. Such methods may include simple treatment of raw or preliminarily refined oils with an excess of alkali over that necessary for saponification, at elevated temperatures and pressures, preferably with an alcohol or other solvent for the alkali. Thus, soya bean or linseed oil fatty acids may be treated with more than sufficient alkali hydroxide for saponification, i. e. alkali hydroxide in excess of one mol of hydroxide for every mol of fatty acid present or developed in the reaction mixture, at high temperatures and pressure.

*Example III*

As an example of a varnish coating composition of this invention utilizing the conjugated soya bean fatty acid glycerides of Example I or II, there may be utilized the following composition:

100 pounds of copal resin is heated with 25 gallons of the conjugated soya bean fatty acid glycerides produced in accordance with Example II. The mixture is heated to between 550 and 590° F. until the mixture becomes homogeneous and begins to thicken to the desired viscosity. The time of boiling is generally determined by the ease of solubility of the resin in the oil and the viscosity desired in the resulting varnish. After reaching the desired viscosity, the mixture is allowed to cool and is diluted with 300 pounds of a diluent such as varnish maker's naphtha, xylene, or the like, and at the same time, suitable amounts of driers such as lead, cobalt, or manganese naphthenates or linoleates are added in the manner well-known to the art.

The resulting varnish dries rapidly and forms a clear, tough film having excellent resistance to water, and mild alkalies and acids. In addition, the film has especially useful properties of adherence, being in this respect, sufficient to cause tight binding on surfaces to which it is applied.

*Example IV*

As a further example of varnish composition utilizing the polyhydroxy alcoholic esters of the conjugated fatty acids of Examples I and II, the following is given:

21 pounds of oil soluble copal resin is heated as before with 18.3 pounds of conjugated linseed oil fatty acid glycerides produced in accordance with Example I or until it becomes homogeneous and the desired viscosity is achieved and is then permitted to cool and is then diluted with 12.6 pounds of turpentine and 42½ pounds of mineral spirits together with a small quantity of driers of the type set forth in Example III.

The composition thus produced is a protective varnish of low cost, useful wherever it is desirable to exclude moisture or moist air from natural woods, paper or the like, or as a protective surfacing coat over ground-color lacquers or paints.

In the place of copal resin in the foregoing examples, there may be used other oil soluble natural resin substitutes such as phenolic resins, glyptol resins and the like.

Example V

As an example of an enamel utilizing the polyhydroxy alcoholic esters of natural oil fatty acids conjugated in accordance with the aforementioned Examples I and II, the following is given:

A varnish composition such as those set forth in Example III or IV is produced and into 66 pounds by weight of the varnish composition, there is ground 34 pounds by weight of a suitable pigmenting material such as titanium dioxide where a white enamel is desired, or for green enamel, a pigmenting material composed of 80.8% of lithopone, 18.0% of chrome green and 1.2 parts of chrome yellow. The pigment is likewise ground into the varnish. Films produced from these enamels have the water resistance, hardness, and drying qualities and adherence which will enable their use particularly for decorative purposes.

Example VI

As an example of a paint composition utilizing the polyhydroxy alcoholic esters of natural oil fatty acids conjugated in accordance with Examples I and II, the following is given:

64 parts by weight of pigment consisting of 28% white lead, 28% zinc oxide and 5% titanium dioxide and 39% of titanium magnesium pigments are ground into 32.4 parts by weight of an oily vehicle consisting of the glycerides of soya bean fatty acids conjugated in accordance with Example II. The mixture is then diluted with 3.6 parts by weight of a thinner liquid such as varnish maker's naphtha, mineral spirits, or turpentine, containing a suitable quantity of dryers specified in Example III.

The paint thus prepared dries quickly into a hard resistant film of good covering qualities.

Example VII

As a further example of a paint composition utilizing the polyhydroxy alcoholic esters of natural oil fatty acids conjugated in accordance with Examples I and II, there may be used the following:

64 parts by weight of pigment consisting of 28% white lead, 28% zinc oxide and 5% titanium dioxide and 39% of titanium magnesium pigments are ground into 32.4 parts by weight of an oily vehicle consisting of the glycerides of soya bean fatty acids conjugated in accordance with Example II. The mixture is then diluted with 3.6 parts by weight of a thinner liquid such as varnish maker's naphtha, mineral spirits, or turpentine, containing a suitable quantity of alkyd resin coating.

In place of the conjugated fatty acid esters of glycerol in the foregoing composition, there may be used the corresponding esters of glycol, sorbitol, erythritol, mannitol and the like where the characteristics of these are desired.

A particular advantage of each of the foregoing coating compositions is the relatively low cost for the quality of protection afforded by the coating. In addition, the coating compositions hereof, whether varnish, lacquer or paint, have in well balanced relationship all of the attributes of rapid drying ability, weather and water resistance, strength, covering power and adherence equalling and in many respects exceeding the lacquers and paints prepared from expensive tung oil and without the disadvantages of non-uniformity and excessive brittleness of tung oil coatings and slow drying and lack of water resistance of ordinary linseed oil coatings. The economical well balanced coating compositions produced as herein described accordingly present a distinct advantage both from the standpoint of price and quality over coating materials heretofore available, and in addition, make available entirely satisfactory coating compositions produced from local and constantly available materials.

This application is a continuation-in-part of my application Serial No. 215,299 filed June 22, 1938.

Many variations in this procedure and products of the present invention will be apparent to those skilled in the art and are intended to be within the scope of the invention herein disclosed and claimed.

What I claim is:

1. A coating composition comprising a resin, a diluent, drier and a soya bean oil product including a mixture of the esters of a polyhydric alcohol and a soya bean oil which has been subjected to a treatment for the conjugation of the polyene fatty acids occurring therein, said product being characterized by the presence of isomers of 10,12 octadecadienoic and isomers of 10,12,14 octadecatrienoic acid residues.

2. A coating composition comprising pigments, diluents and a soya bean oil product including a mixture of the esters of a polyhydric alcohol and a soya bean oil which has been subjected to a treatment for the conjugation of the polyene fatty acids occurring therein, said product being characterized by the presence of isomers of 10,12 octadecadienoic and isomers of 10,12,14 octadecatrienoic acid residues.

3. A coating composition comprising a resin, a diluent, drier and a soya bean oil product including a mixture of the esters of glycerol and a soya bean oil which has been subjected to a treatment for the conjugation of the polyene fatty acids occurring therein, said product being characterized by the presence of isomers of 10,12 octadecadienoic and isomers of 10,12,14 octadecatrienoic acid residues.

4. A coating composition comprising pigments, diluents and a soya bean oil product including a mixture of the esters of glycerol and a soya bean oil which has been subjected to a treatment for the conjugation of the polyene fatty acids occurring therein, said product being characterized by the presence of isomers of 10,12 octadecadienoic and isomers of 10,12,14 octadecatrienoic acid residues.

5. A liquid coating composition adapted to dry relatively rapidly and to form an impervious adherent protective film comprising an evaporable diluent, drier and a mixture of polyhydric alcoholic esters of a natural vegetable oil fatty acid charaterized by the presence of isomers of 10,12 octadecadienoic and acid residues and isomers of 10,12,14 octadecatrienoic acid residues.

6. A liquid coating composition adapted to dry relatively rapidly and to form an impervious adherent protective opaque film comprising an evaporable diluent, drier, pigment and a mixture of polyhydric alcoholic esters of a natural vegetable oil fatty acid characterized by the presence of isomers of 10,12 octadecadienoic acid residues and isomers of 10,12,14 octadecatrienoic acid residues.

7. A liquid coating composition adapted to dry relatively rapidly and to form an impervious adherent film comprising an evaporable diluent, drier, resin and a mixture of polyhydric alcoholic esters of a natural vegetable oil fatty acid characterized by the presence of isomers of 10,12 octadecadienoic acid residues and isomers of 10,12,14 octadecatrienoic acid residues.

8. A coating composition capable of drying into a hard impervious adherent protective film comprising an evaporable diluent, a drier and a mixture of esters of a polyhydric alcohol and the fatty acids of natural vegetable semi-drying oils, said fatty acids being characterized by containing a mixture of substantial amounts of isomeric polyene acid residues of 10,12 octadecadienoic acid and 10,12,14 octadecatrienoic acid types.

9. A coating composition capable of drying into a hard impervious, resistant, adherent film comprising an evaporable diluent, a drier, and a product mixture resulting from the reaction of glycerine and the fatty acids of natural vegetable semi-drying oils, said fatty acids being characterized by containing a mixture of substantial amounts of isomeric polyene acid residues of 10,12 octadecadienoic acid and 10,12,14 octadecatrienoic acid types.

10. A coating composition comprising a resin, a diluent, drier and a linseed oil product including a mixture of the esters of a polyhydric alcohol and linseed oil which has been subjected to a treatment for the conjugation of the polyene fatty acids occurring therein, said product being characterized by the presence of isomers of 10,12 octadecadienoic and isomers of 10,12,14 octadecatrienoic acid residues.

11. A coating composition comprising pigments, diluents and a linseed oil product including a mixture of the esters of a polyhydric alcohol and linseed oil which has been subjected to a treatment for the conjugation of the polyene fatty acids occurring therein, said product being characterized by the presence of isomers of 10,12 octadecadienoic and isomers of 10,12,14 octadecatrienoic acid residues.

12. A coating composition comprising a resin, a diluent, drier and a linseed oil product including a mixture of the esters of glycerol and linseed oil which has been subjected to a treatment for the conjugation of the polyene fatty acids occurring therein, said product being characterized by the presence of isomers of 10,12 octadecadienoic and isomers of 10,12,14 octadecatrienoic acid residues.

13. A coating composition comprising pigments, diluents and a linseed oil product including a mixture of the esters of glycerol and linseed oil which has been subjected to a treatment for the conjugation of the polyene fatty acids occurring therein, said product being characterized by the presence of isomers of 10,12 octadecadienoic and isomers of 10,12,14 octadecatrienoic acid residues.

GEORGE O. BURR.